Patented Aug. 1, 1939

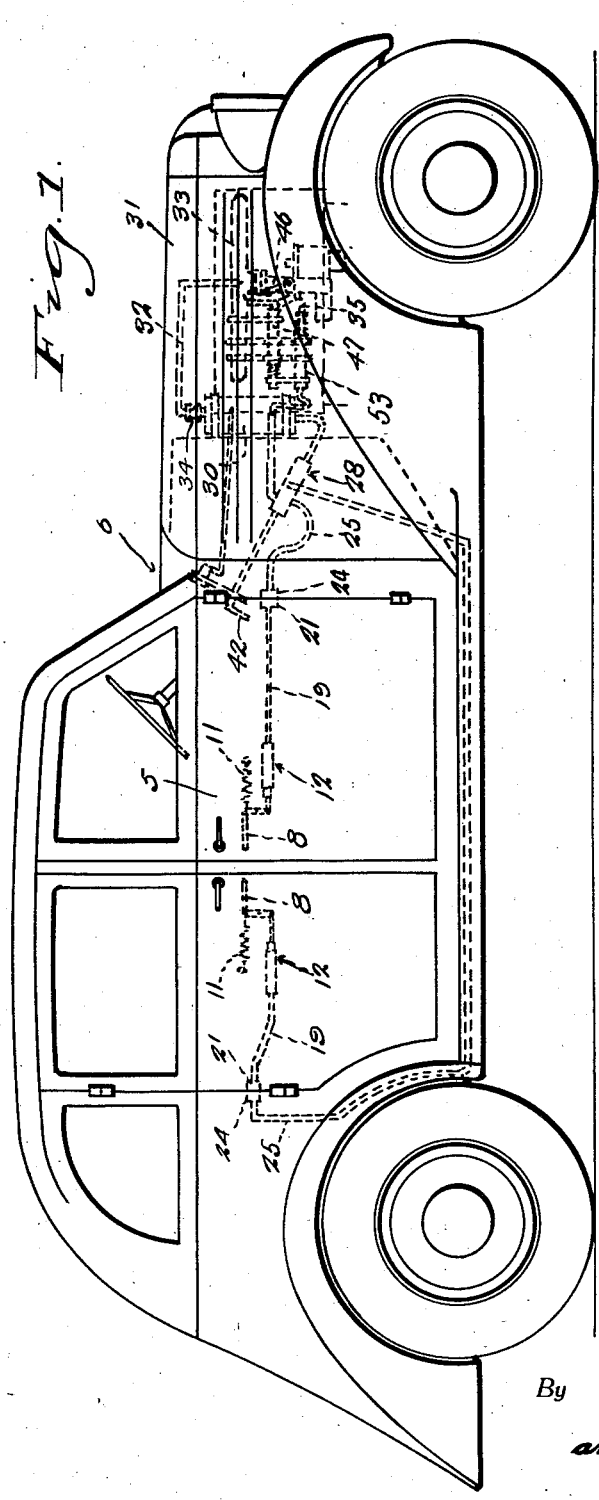

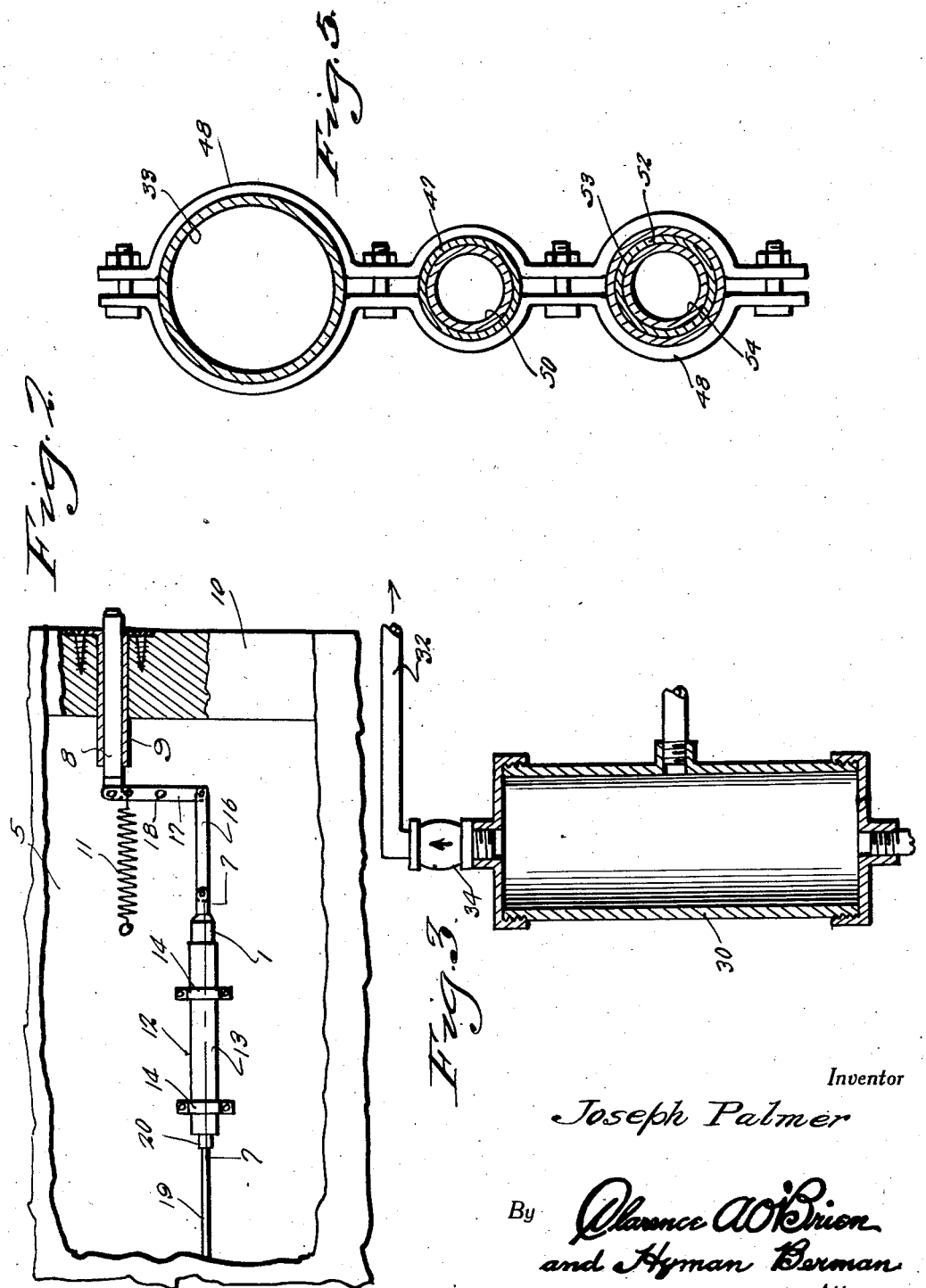

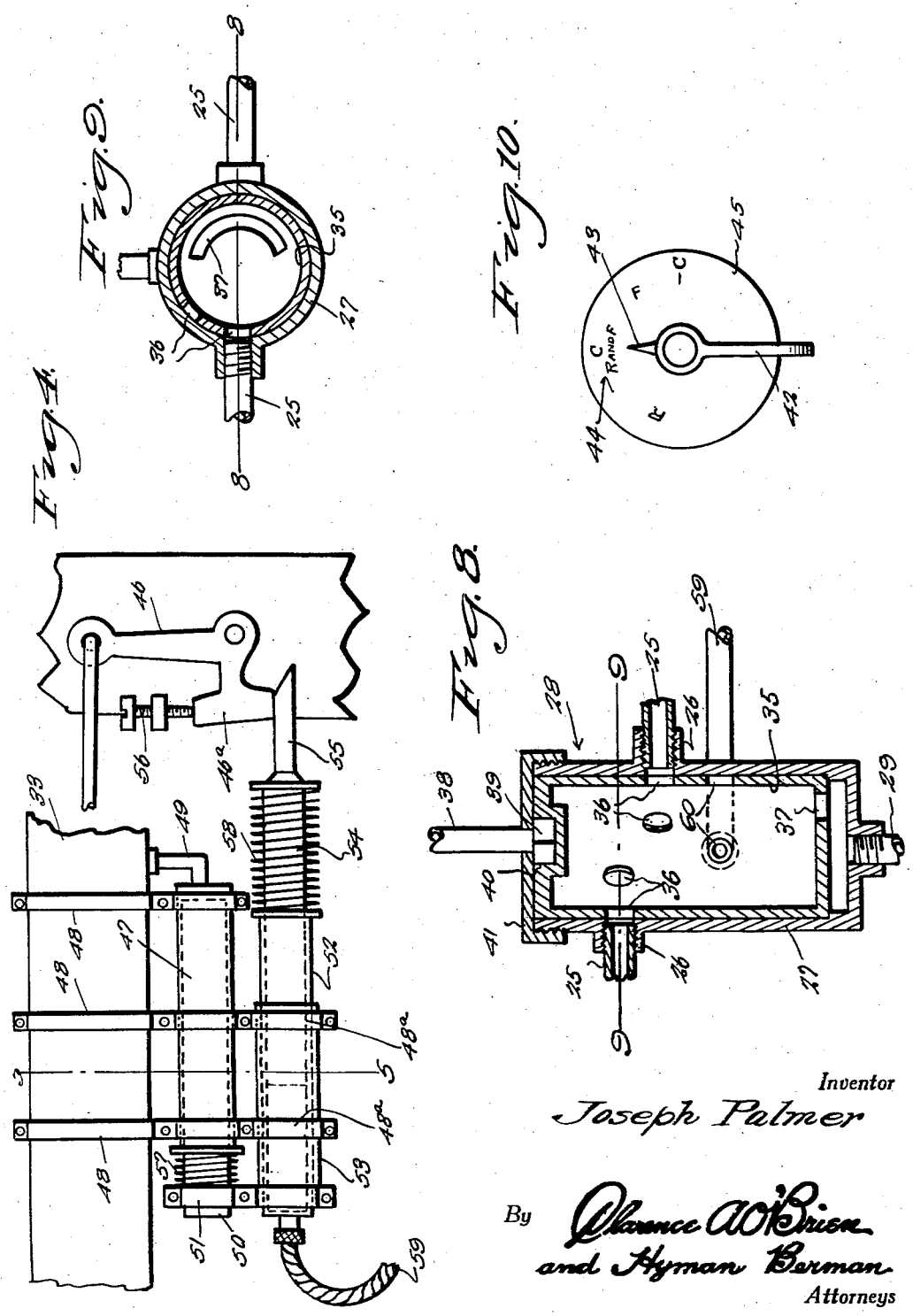

2,167,675

UNITED STATES PATENT OFFICE 2,167,675

MOTOR VEHICLE DOOR LOCK

Joseph Palmer, New Rochelle, N. Y.

Application May 9, 1938, Serial No. 206,908

4 Claims. (Cl. 180—82)

This invention relates to closure fasteners and more particularly to a door lock for the door of an automobile body.

An object of the present invention is to provide means for locking the doors of an automobile body in such a manner that the locking devices, in response to vacuum, will hold the doors securely locked so that said doors cannot be opened while the vehicle is in motion.

Further in accordance with the present invention means is also provided for locking the throttle lever of an internal combustion engine simultaneously with an unlocking of the doors of the automobile so that the butterfly valve controlling the supply of fuel to the internal combustion engine can be operated only when the doors are securely locked.

The invention together with its objects and advantages will be best understood from a study of the following description taken in connection with the accompanying drawings wherein:

Figure 1 is a side elevational view of an automobile illustrating the application of the invention thereto, Figure 2 is an enlarged detail view partly in section and partly in elevation of an automobile door showing a lock assembly associated therewith, Figure 3 is a sectional view through a vacuum tank, Figure 4 is a fragmentary side elevational view showing the lock for the butterfly valve lever.

Figure 5 is a sectional view taken substantially on the line 5—5 of Figure 4,

Figure 6 is a fragmentary sectional view taken in the region of the hinge mounting of an automobile door and showing the manner of connecting the vacuum conduit associated with the door and body respectively of the automobile body, Figure 7 is a longitudinal sectional view through a vacuum-responsive bolt-operating member, Figure 8 is a vertical sectional view through a control valve, Figure 9 is a horizontal sectional view taken substantially on the line 9—9 of Figure 8, Figure 10 is a plan view showing a combination operating handle and index for the control valve and a scale against which the index is readable for indicating the position of the control valve.

Referring to the drawings by reference numerals it will be seen that in accordance with the present invention there is provided for each of the doors 5 of a conventional automobile 6 a lock assembly which, as shown in Figure 2, includes a bolt 8 slidable through a suitable guide 9 provided in the edge 10 of the door, and which bolt 8 is yieldably urged into a retracted position through the medium of a suitably provided spring 11.

Connected with the bolt 8 is a vacuum responsive device 12 which consists of a fixed cylinder 13 suitably mounted in the hollow of the door through the medium of brackets 14 and an elongated piston 15 which has a sliding fit in the cylinder 13. At the outer end thereof the piston 15 is pivotally connected through the medium of a link 16 with a lever 17 that is pivoted intermediate its ends within the hollow of the door 5 as at 18, the lever 17 at the opposite end thereof being pivoted to the inner end of the bolt 8 as shown in Figure 2. A vacuum conduit 19 is connected with one end of the cylinder 13 as at 20. It will thus be seen that upon the formation of vacuum in the line 19 piston 14 will be caused to move inwardly of the cylinder 13 resulting in a rocking of the lever 17 in a clockwise direction thus projecting the bolt 8 to engage the usual keeper therefor and thereby securely lock the door 5 in closed position.

The conduit 19 connected with each cylinder 13 extends to the hinged edge of the door and terminates in a flanged end seating within a recess 21 provided in the hinged edge of the door as shown in Figure 6. Seated within the recess 21 is an apertured washer 22 of rubber or other suitable material which, when the door 5 is in closed position, abuts and aligns with a complemental apertured disk or washer 23 seated within a recess 24 provided in the edge of the body of the vehicle against which the hinge edge of the door 5 abuts when said door 5 is in closed position. The washer 23 is in alignment with an end of a conduit 25 that is suitably concealed within the body portion of the automobile.

The several conduits 25 are suitably connected as at 26 with the casing 27 of a control valve 28. (See Fig. 8.)

The casing 27 of the control valve 28 is connected through the medium of a conduit 29 with a vacuum tank 30 suitably mounted beneath the hood 31 of the automobile as suggested by broken line in Fig. 1, and which vacuum tank is in turn connected through the medium of a conduit 32 with the intake manifold 33 of the internal combustion engine. In the connection between the tank 30 and the conduit 32 is a check valve 34.

The control valve 28 also includes a hollow valve core 35 that has a rotating fit within the casing 27 and is provided with pairs of ports 36 in the periphery thereof to be selectively used dependent upon whether or not it is desired to hold all or only any selected one of the doors locked under the influence of vacuum.

Also, in the bottom thereof the valve core 35 is provided with a port 37 to communicate the interior of the valve core with the vacuum tank.

For operating, that is to say rotating the valve core 35 to the desired position of adjustment there is provided an operating stem 38 that at one end is provided with a squared head 39 that fits within a squared recess 40 provided therefor in one end of the valve core 35. Head 39 is held in engagement with the recess or socket 40 through the medium of a cap 41 threaded on one end of the valve casing 27.

The stem 38 extends through the instrument board of the automobile and at said end is provided with a manipulating handle 42. Handle 42 is provided with an index 43 adapted to be read against a dial 44 provided on a dial plate 45 suitably mounted on the instrument board. A dial indicia 44 is shown in Fig. 10 and is such that by reading the index 43 thereagainst the operator may know the position of adjustment of the valve core 35, that is to say whether the core is in such a position that vacuum is being used for holding all of the doors locked, or all of the doors and, in a manner hereinafter made manifest, the throttle valve lever 46 locked, or only certain of the doors locked, leaving the other doors free to be opened as found desirable.

Thus it will be seen that with the valve core 35 in a proper position of adjustment vacuum in the lines 19 and 25 will serve to draw the pistons 15 inwardly of their respective cylinders 13 and consequently the door bolts 8 to projected position for securing the doors 5 locked; the vacuum being created during the running of the internal combustion engine. Thus it will be seen that while the engine is running the doors 5 may be securely locked and against accidental or unauthorized opening thereof. Obviously such is a material safety feature especially where the rear of the automobile is being occupied by small children.

For locking the throttle or butterfly valve lever 46 against movement to move the valve to open position when the vehicle is at rest, I provide an assembly as clearly shown in Fig. 4 and which consists of a cylinder 47 suspended from the intake manifold 33 through the medium of brackets 48 and connected at one end with the manifold 33 through the medium of a conduit 49. A piston 50 has a sliding fit within the cylinder 47 and this piston is connected by a suitable clamp 51 with a cylinder 52 that has a sliding fit in a guide sleeve 53 that is suspended from the cylinder 47 through the medium of clamp extensions 48a.

Slidably fitting within the cylinder 52 is a piston 54 which is provided at its outer end with an integral latch rod 55 that is adapted to be projected in the path of the weighted end 46a of butterfly valve operating lever 46 as shown in Fig. 4 whereby to cooperate with the adjusting screw 56 usually provided for the lever for securing the lever against unauthorized movement.

Piston 50 is normally projected outwardly with respect to its cylinder 47 through the medium of a suitably provided coil spring 57 while piston 54 is normally projected outwardly with respect to its associated cylinder 52 through the medium of a coil spring 58.

As shown in Figure 4 cylinder 52 is also connected with a port provided therefor in the casing 27 of valve 28 through the medium of a flexible vacuum conduit 59. The core 35 is provided with a pair of ports 60 which cooperate with the conduit 59 to place the cylinder 52 in communication with the valve 28 when the core 35 is in either one of two positions.

From the above it will be apparent that when it is desired to permit manipulation of the butterfly valve for the running of the vehicle and the rear and front doors locked in response to vacuum the valve lever 42 is turned to the position shown in Figure 10 whereupon the valve core 35 is in such a position that vacuum will be utilized for drawing and maintaining pistons 15 in an inward position in respect to their associated cylinders 13 for holding the bolts 8 of the doors in projected position, and at the same time a suction is created in cylinder 53 through conduit 59 and one of the ports 60 for retracting the piston 54 and latch bar 55. This permits the throttle lever 46 to be manipulated in the running of the car and all the doors are held in locked position.

Obviously when it is desired to maintain only the rear doors locked the valve lever 42 is turned in a counter-clockwise direction from the position shown in Fig. 10 to position the index 43 in alignment with the letter "R" at the left of Fig. 10.

When it is desired to maintain only the front doors locked lever 42 is swung in a clockwise direction to align the index 43 with the letter "F" at the right of Fig. 10.

When the valve lever 42 is turned to either the letter R or the letter F the core 35 is in a position to place the locks of two doors in communication with the interior of the core while the locks of the other two doors are out of communication with the core 35 and in these two positions of the lever 42 both ports 60 are out of communication with the conduit 59 so that the vacuum to the cylinder 53 is broken and thus the spring 58 will project the latch bar 55 so that the throttle lever cannot be moved beyond idling position so that it will be impossible to start the vehicle while any of the doors are open.

When it is desired to test the motor of the vehicle the lever 42 is turned to a position where the pointer 43 will be opposite the lower letter C which will place the port 60 shown in section in Figure 8 opposite the conduit 59 so that vacuum will be produced in the cylinder 53 to retract the latch bar 55 and thus the throttle lever can be manipulated to run the engine and in this position the ports 36 are out of communication with the conduits 25 so that the doors are all open. When the engine is not in operation of course no suction is produced thereby and then the spring 57 moves the piston 50 and cylinder 53 to the left in Figure 4 so that the latch bar 55 is moved from under the throttle lever which permits the engine to be started up by the starter; but when the engine begins to operate and produces sufficient suction to move the piston 50 to the right against the action of the spring 57 the rod 55 is projected under the throttle lever which prevents the throttle lever being opened to a sufficient degree to cause the engine to move the vehicle.

It is thought that a clear understanding of the construction, utility and advantages of an invention of this character will be had without a more detailed description.

Having thus described the invention what is claimed as new is:

1. In a vehicle locking device, and in combination with the doors of the vehicle, an internal combustion engine having an intake manifold, and a butterfly valve control lever, locking bolts slidably mounted on the doors, vacuum responsive devices connected with said bolts in a manner to act thereon for projecting the bolts to a door-locking position, a spring-projected latch bar mounted in operative position to the butterfly valve control lever and normally projected by said spring into engagement with the lever for releasably securing the latter locked against movement, a vacuum responsive device connected with said latch bar in a manner to act on the latch bar to retract the latter out of engagement with said lever and in opposition to said spring, and conduit means connecting all of said vacuum responsive devices with said intake manifold.

2. In a vehicle locking device, and in combination with the doors of the vehicle, an internal combustion engine having an intake manifold, and a butterfly valve control lever, locking bolts slidably mounted on the doors, vacuum responsive devices connected with said bolts in a manner to act thereon for projecting the bolts to a door-locking position, a spring-projected latch bar mounted in operative position to the butterfly valve control lever and normally projected by said spring into engagement with the lever for releasably securing the latter locked against movement, a vacuum responsive device connected with said latch bar in a manner to act on the latch bar to retract the latter out of engagement with said lever and in opposition to said spring, conduit means connecting all of said vacuum responsive devices with said intake manifold, and a manually operable control valve arranged in said conduit means for controlling communication between said vacuum responsive devices and the intake manifold whereby all or a selected one or more of the several vacuum responsive devices may be operated simultaneously or selectively, optionally.

3. In a vehicle locking device, and in combination with the doors of the vehicle, an internal combustion engine having an intake manifold, and a butterfly valve control lever, locking bolts slidably mounted on the doors, vacuum responsive devices connected with said bolts in a manner to act thereon for projecting the bolts to a door-locking position, a spring-projected latch bar mounted in operative position to the butterfly valve control lever and normally projected by said spring into engagement with the lever for releasably securing the latter locked against movement, a vacuum responsive device connected with said latch bar in a manner to act on the latch bar to retract the latter out of engagement with said lever and in opposition to said spring, conduit means connecting all of said vacuum responsive devices with said intake manifold, an additional vacuum responsive device mounted intermediate the intake manifold and the aforementioned vacuum responsive device connected with said latch, conduit means connecting said additional vacuum responsive device directly with said intake manifold, and means connecting said additional vacuum responsive device with the vacuum responsive device connected with said latch bar whereby to shift the latter mentioned vacuum responsive device and said latch rod bodily in either direction, as and for the purpose specified.

4. In a vehicle locking device, and in combination with the doors of the vehicle, an internal combustion engine having an intake manifold, and a butterfly valve control lever, locking bolts slidably mounted on the doors, vacuum responsive devices connected with said bolts in a manner to act thereon for projecting the bolts to a door-locking position, a spring-projected latch bar mounted in operative position to the butterfly valve control lever and normally projected by said spring into engagement with the lever for releasably securing the latter locked against movement, a vacuum responsive device connected with said latch bar in a manner to act on the latch bar to retract the latter out of engagement with said lever and in opposition to said spring, conduit means connecting all of said vacuum responsive devices with said intake manifold, a manually operable control valve arranged in said conduit means for controlling communication between said vacuum responsive devices and the intake manifold whereby all or a selected one or more of the several vacuum responsive devices may be operated simultaneously or selectively, optionally, and a vacuum tank interposed in the connection between said control valve and intake manifold.

JOSEPH PALMER.